(12) United States Patent
Kawasaki et al.

(10) Patent No.: US 8,837,008 B2
(45) Date of Patent: Sep. 16, 2014

(54) IMAGE READING APPARATUS

(75) Inventors: Shigeru Kawasaki, Yokohama (JP);
Tsuyoshi Yoshida, Kawasaki (JP);
Hiroyuki Takahara, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 13/467,252

(22) Filed: May 9, 2012

(65) Prior Publication Data

US 2013/0003141 A1    Jan. 3, 2013

(30) Foreign Application Priority Data

Jun. 28, 2011    (JP) ................. 2011-142781

(51) Int. Cl.
*H04N 1/04*    (2006.01)
*H04N 1/024*    (2006.01)
*H04N 1/10*    (2006.01)
*G03G 15/00*    (2006.01)
*H04N 1/047*    (2006.01)
*H04N 1/00*    (2006.01)

(52) U.S. Cl.
CPC .......... *H04N 1/0249* (2013.01); *H04N 1/1017* (2013.01); *H04N 2201/02454* (2013.01); *H04N 2201/02479* (2013.01); *H04N 1/103* (2013.01); *H04N 1/1039* (2013.01); *H04N 2201/04725* (2013.01); *G03G 15/602* (2013.01); *H04N 1/1043* (2013.01); *H04N 2201/0081* (2013.01); *H04N 2201/02466* (2013.01); *H04N 2201/0464* (2013.01); *H04N 1/0473* (2013.01); *H04N 1/0083* (2013.01)
USPC ........................ 358/474; 358/497; 358/496

(58) Field of Classification Search
CPC .......... B41J 29/38; B41J 19/202; H04N 1/04
USPC .................. 358/474, 496, 486, 497, 501
See application file for complete search history.

(56) References Cited

U.S. PATENT DOCUMENTS

| | | | | |
|---|---|---|---|---|
| 4,903,252 A | * | 2/1990 | Tanaka et al. | 369/30.43 |
| 5,005,967 A | * | 4/1991 | Kuriyama | 353/101 |
| 5,264,949 A | * | 11/1993 | Stemmle | 358/474 |
| 6,042,104 A | * | 3/2000 | Nishikori et al. | 271/121 |
| 6,075,960 A | * | 6/2000 | Uchida | 399/212 |
| 6,092,023 A | * | 7/2000 | Kunishige | 702/1 |
| 6,713,985 B2 | * | 3/2004 | Aoshima | 318/696 |
| 6,952,292 B2 | * | 10/2005 | Takeuchi et al. | 358/497 |
| 6,985,269 B1 | * | 1/2006 | Takeuchi | 358/497 |
| 7,042,596 B1 | * | 5/2006 | Yoshida | 358/472 |
| 7,161,716 B1 | * | 1/2007 | Kawasaki et al. | 358/497 |
| 7,253,930 B2 | * | 8/2007 | Hendrix et al. | 358/474 |

(Continued)

FOREIGN PATENT DOCUMENTS

| | | |
|---|---|---|
| JP | 2002-044385 A | 2/2002 |
| JP | 2004-054283 A | 2/2004 |

*Primary Examiner* — Negussie Worku
(74) *Attorney, Agent, or Firm* — Fitzpatrick, Cella, Harper & Scinto

(57) ABSTRACT

An image reading apparatus includes a drive unit that is mounted on a carriage having an image reading sensor, which is moved with respect to an original, mounted thereon and moves the carriage. The drive unit includes: a motor; a gear train for transmitting rotation of the motor so as to move the carriage; an encoder sensor for reading a code wheel fixed to a rotary shaft of the motor; and a support member for holding the motor. The encoder sensor is urged against a part of the support member by a resilient member, to be thus fixed to the support member.

11 Claims, 3 Drawing Sheets

(56) References Cited

U.S. PATENT DOCUMENTS

| | | | |
|---|---|---|---|
| 7,378,644 B2 * | 5/2008 | Kubota et al. | 250/234 |
| 7,394,575 B2 * | 7/2008 | Satake | 358/412 |
| 7,443,132 B2 * | 10/2008 | Yoshihisa et al. | 318/807 |
| 7,821,685 B2 * | 10/2010 | Yoshihisa | 358/497 |
| 8,040,577 B2 * | 10/2011 | Akiyama | 358/486 |
| 8,081,356 B2 * | 12/2011 | Yamauchi | 358/497 |
| 8,089,664 B2 * | 1/2012 | Yokochi | 358/474 |
| 8,159,731 B2 * | 4/2012 | Sato et al. | 358/497 |
| 8,218,204 B2 * | 7/2012 | Hozono | 358/474 |
| 8,289,587 B2 * | 10/2012 | Yamauchi | 358/497 |
| 8,310,742 B2 * | 11/2012 | Nozaki | 358/514 |
| 8,373,374 B2 * | 2/2013 | Kanoyadani et al. | 318/466 |

* cited by examiner

IMAGE READING APPARATUS

BACKGROUND OF THE INVENTION

1. Field of the Invention

The present invention relates to an image reading apparatus for reading an image of an original, such as an image scanner, a multifunction machine (multifunction peripheral), a copying machine, or a facsimile apparatus.

2. Description of the Related Art

An image reading apparatus of a flatbed type is provided with an original glass table, a carriage whose part slides on a guide rail while moving substantially in parallel to the original glass table, and an image reading sensor mounted on the carriage, for reading an image of an original placed on the original glass table as the carriage is moved. A unit for moving the carriage has been known as being configured to transmit drive force of a drive motor housed inside of the apparatus via a plurality of gears and pulleys, a drive wire, and the like. (See Japanese Patent Application Laid-open No. 2002-44385.)

There has been known a scanning type in which a guide rail and a belt are eliminated, and further, a component part having an image reading sensor mounted thereon runs by itself on a rack molded with plastic in place of a guide rail so as to reduce a cost. (See Japanese Patent Application Laid-open No. 2004-54283.)

An image reading apparatus has recently required a high reading accuracy for the purpose of a high resolution, and further, it has required miniaturization and thinness from the viewpoint of usability. In order to read an image with a high accuracy, feedback control is carried out such that an encoder is employed to monitor the rotation of a DC motor for driving a carriage having an original reading sensor mounted thereon. However, for the purpose of the implementation of the feedback control, a board or the like having the encoder mounted thereon is fixed to the DC motor, thereby enlarging a space in a thickness direction of the apparatus in, for example, a conventional product. Moreover, a drive unit housed inside of the image reading apparatus is disposed at a lower portion of the carriage having the image reading sensor mounted thereon or on the lower portion and a side of the carriage, and therefore, the size, in particular, the thickness of a scanner unit becomes great. As a consequence, the thickness of the apparatus also becomes great.

SUMMARY OF THE INVENTION

An object of the present invention is to provide an image reading apparatus capable of simultaneously both reading an image with a high accuracy and reducing the size and thickness of the apparatus in a high order.

An image reading apparatus according to the present invention includes a table having a surface, on which an original is placed; a carriage that has an image reading sensor mounted thereon and is moved in a scan direction being parallel to the surface and crossing a longitudinal direction of the image reading sensor; and a drive unit that is mounted on the carriage and moves the carriage. The drive unit includes a motor; a gear train for transmitting rotation of the motor so as to move the carriage; an encoder sensor for reading a code wheel fixed to a rotary shaft of the motor; and a support member for holding the motor therein. Here, the encoder sensor is urged against a part of the support member by a resilient member, to be thus fixed to the support member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An image reading apparatus according to the present invention is applicable to a flatbed scanner apparatus, a copying machine in which a scanner apparatus, a printer apparatus, and the like are composed together, a facsimile apparatus, a multifunction machine, and the like. Hereinafter, an image reading apparatus (scanner apparatus) for capturing an original image into a computer or the like will be exemplified.

Figure 1A:
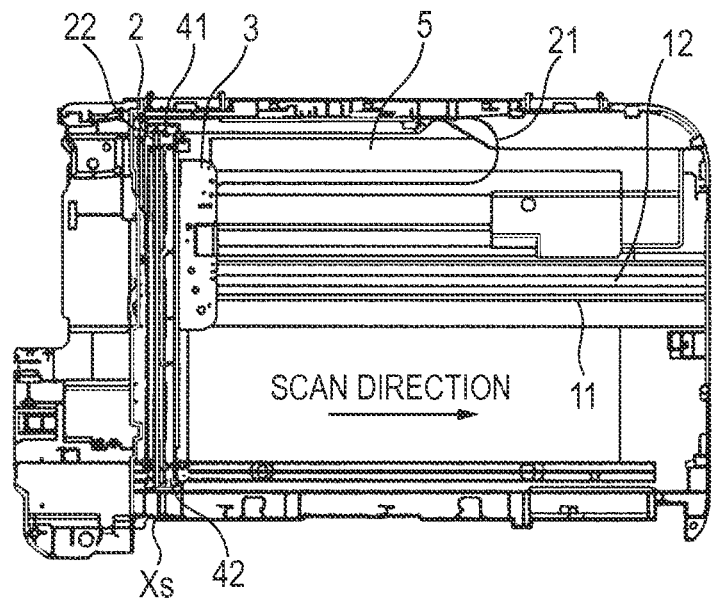
FIGS. 1A, 1B, 1C and 1D are views showing the entire image reading apparatus in a preferred embodiment according to the present invention.
Figure 1D:
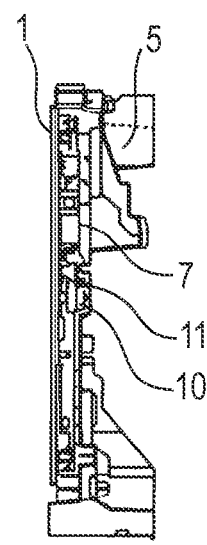
Figure 1B:
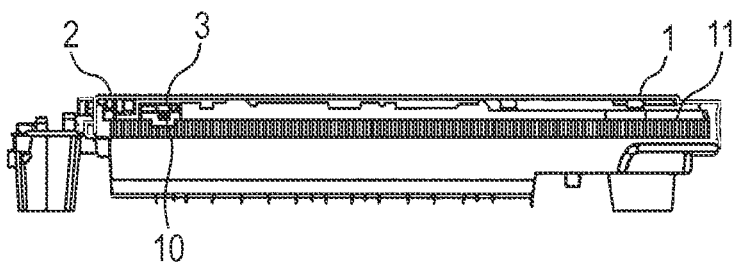
Figure 1C:
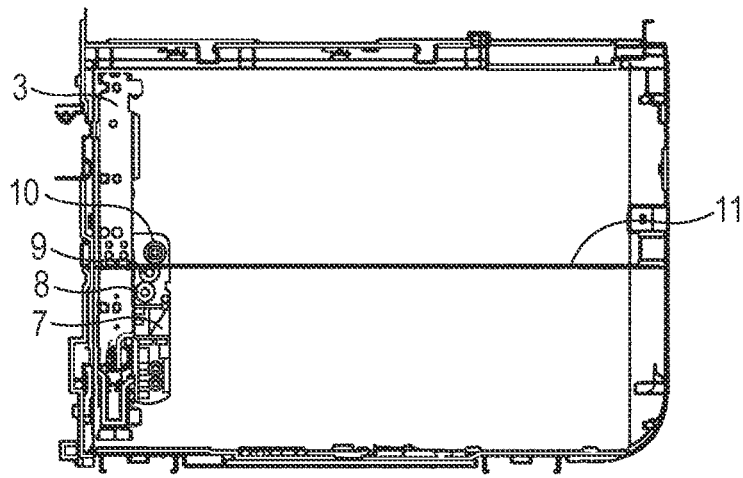
Figure 2A:
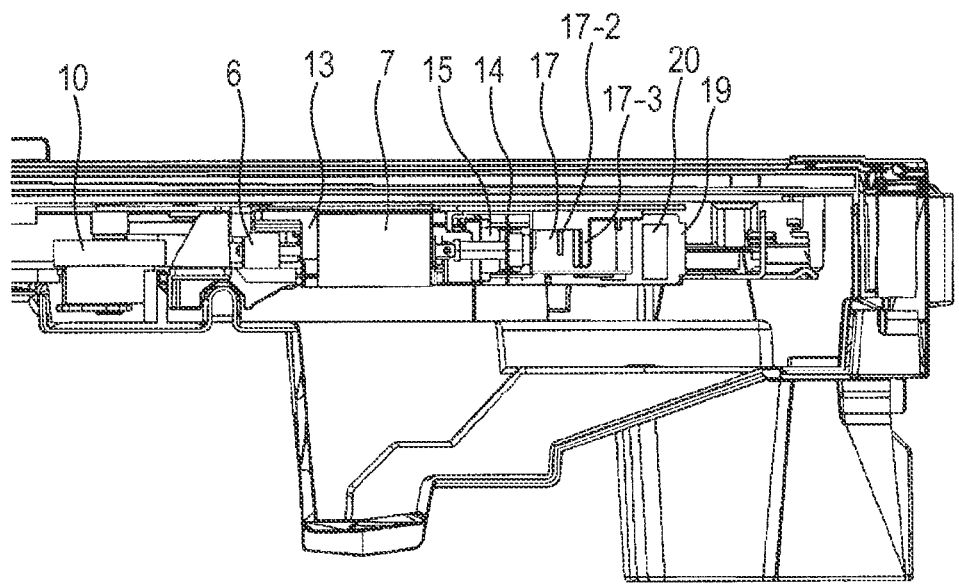
FIGS. 2A and 2B are views showing an image reading unit in the image reading apparatus.
Figure 2B:
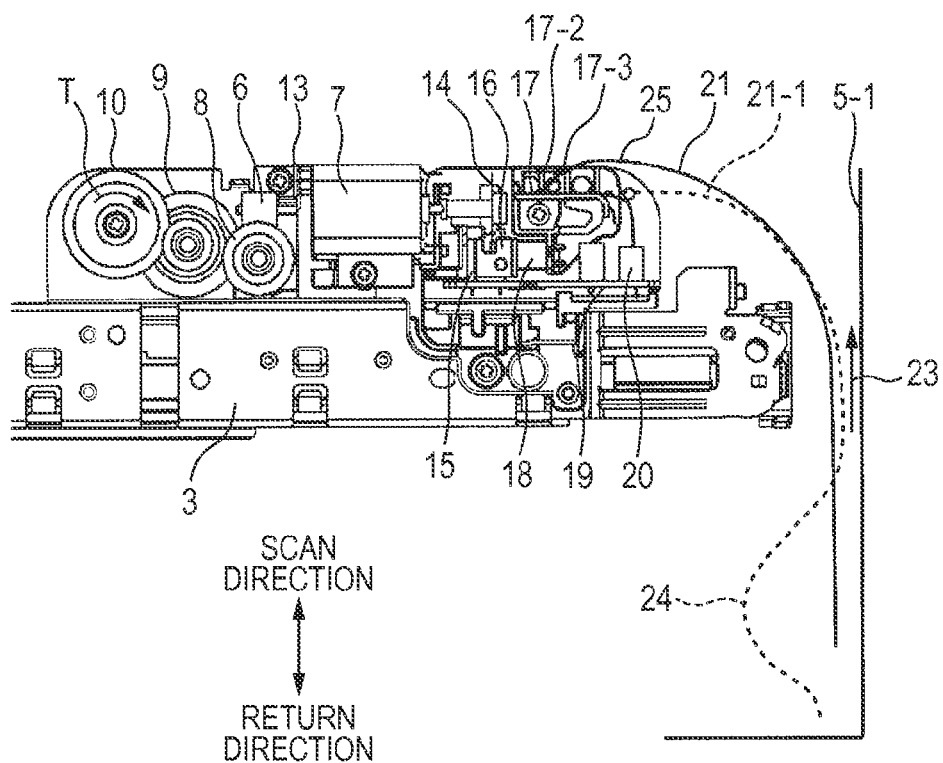

FIG. 1A is a top view showing the present preferred embodiment; FIG. 1B is a principal cross-sectional view showing the present preferred embodiment; FIG. 1C is a bottom view showing the present preferred embodiment; and FIG. 1D is a right cross-sectional view showing the present preferred embodiment. FIG. 2A is an enlarged view showing a drive unit shown in FIG. 1D; and FIG. 2B is an enlarged view showing the drive unit shown in FIG. 1C.

A rack 11 arranged along a scan direction is disposed in a body frame 5 of the image reading apparatus. A pinion gear 10 meshes with the rack 11. A rail 12 arranged along the scan direction in the same manner as the rack 11 is disposed on a side opposite to the pinion gear 10 in the rack 11.

An original table 1 made of a transparent glass plate having an upper surface, on which an original is placed, is disposed in the body frame 5. At the lower surface of the original table 1, an image reading sensor 2 (hereinafter referred to as a "CIS 2") of a line type serving as an optical unit for reading an image of an original is supported by a carriage 3.

The CIS 2 is an integral unit including LEDs for illuminating the original, a rod lens array for focusing an image light beam reflected on the original by the illumination of the LEDs, and an optical sensor element for photoelectric converting the image focused by the rod lens array. The CIS 2 extends in an elongated manner in a planar direction of the original table 1, and in a direction crossing (preferably perpendicular to) the scan direction (i.e., a longitudinal direction). The CIS 2 has a reading width equal to the width of an original of a maximum size placed on the upper surface of the original table 1, and captures an image of one line. The carriage 3 can be moved in the scan direction crossing the direction in which the CIS 2 extends and is parallel to the original table 1.

Spacers 41 and 42 are arranged at the upper surfaces at both ends of the CIS 2. Like Japanese Patent Application Laid-open No. 2002-44385, the CIS 2 is urged toward the original table 1 at either of ends of the CIS 2 by a compression spring (i.e., an urging unit), not shown, whereas at the other end by its reaction force. In this manner, the spacers 41 and 42 abut against the original table 1, so that the CIS 2 is moved in the scan direction at a predetermined distance from the original table 1.

On the carriage, a drive unit for scanning the CIS 2 so as to read an original image in the CIS 2 is intensively disposed on either side in a lateral direction (i.e., downstream in the scan direction) of the CIS 2 in such a manner as not to overlap the CIS 2 in a height direction. Specifically, the drive unit is intensively disposed in one direction with respect to the scan direction of the carriage 3, as the drive unit is viewed in a direction perpendicular to the surface of the original table 1. The drive unit designates a unit including a DC motor 7, a drive gear train, and an electric board 19 having an encoder sensor 15 and a connector 20 mounted thereon. That is to say, the drive unit is a unit that is mounted on the carriage and is adapted to generate force for moving the carriage.

A detailed description will be given below of the configuration in which the drive unit is intensively disposed. The DC motor 7 is securely positioned in the carriage 3 via a support plate 13 (i.e., a motor support member) such that its rotary shaft (i.e., a drive output shaft) is parallel to a longitudinal direction of the CIS 2. A worm gear 6 is securely fitted nearer the rack 11 at one end of the rotary shaft of the DC motor 7. A code wheel 14 made of a code plate, on which black stripe patterns (i.e., slit patterns) are printed at equal intervals in a circumferential direction, is fixed at the other end of the rotary shaft of the DC motor 7 (i.e., on a side opposite to the worm gear 6), wherein a transparent disk serves as a base. The drive gear train (including an idler gear 8, an idle gear 9, and the pinion gear 10) for transmitting a drive force from the DC motor 7 to the rack 11 is contained in a space defined between the worm gear 6 and the rack 11. The drive force of the DC motor 7 is transmitted to the pinion gear 10 at a final stage to thus mesh with the rack 11, thereby achieving a reciprocating motion of the carriage 3 in the scan direction.

The encoder sensor 15 is provided in a space on the side of the code wheel 14 in the DC motor 7 in the drive unit, for detecting the rotation (i.e., amount of rotation or a rotational speed) of the DC motor 7 together with the code wheel 14 so as to control the amount of rotation or the rotational speed. The encoder sensor 15 includes a photo interrupter including a light source and a light receiving element for reading the slit patterns formed on the code wheel 14.

Moreover, there is provided the electric board 19 having the connector 20 mounted thereon for electrically connecting to a control board (i.e., a main board), not shown, via a flexible cable 21 (hereinafter referred to as an "FFC 21"). As described above, the encoder sensor 15 functions together with the code wheel 14, and therefore, is disposed near the DC motor 7 on the electric board 19. The connector 20 is disposed in a free space apart from the DC motor 7, thereby facilitating assembling work to allow the FFC 21 to be inserted or withdrawn by an assembling worker.

The electric board 19 is formed in such a size as to mount at least the encoder sensor 15 thereon in the lateral direction and to mount at least the encoder sensor 15 and the connector 20 thereon in the longitudinal direction for the purpose of the thickness reduction of the apparatus. In order to reduce the volume of the drive unit, the electric board 19 is disposed such that a normal direction with respect to a mounting surface of the encoder sensor 15 and the connector 20 is parallel to the scan direction and the longitudinal end face of the electric board 19 is parallel to the direction of the rotary shaft of the DC motor 7.

As described above, the drive unit is intensively disposed on either side in the lateral direction of the CIS 2 on the carriage 3 (i.e., a lower side in the scan direction) in such a manner as not to overlap the CIS 2 in the height direction, thereby contributing to the reduced thickness of the apparatus.

Additionally, a flexible cable positioning member 17 (hereinafter referred to as an "FFC positioning member 17") for restricting and positioning the FFC 21 is provided for connecting the FFC 21 to a control board (i.e., a main board), not shown, through a predetermined route from the electric board 19. Explanation will be made below on the FFC positioning member 17.

As described above, the FFC 21 is inserted at one end thereof into the connector 20 whereas it is connected at the other end to the control board (i.e., the main board), not shown, wherein a section between these ends of the FFC 21 is brought into partly contact with an inner wall 5-1 of the body frame 5. Therefore, particularly in a return direction reverse to the scan direction, the FFC 21 receives a friction force 23 all the time between the inner wall 5-1 and itself. At this time, as shown in FIG. 2B (an FFC 21-1 (indicated by a broken line)), if the FFC 21-1 comes from the electric board 19 through the FFC positioning member 17 toward the inner wall 5-1 in a direction perpendicular to the inner wall 5-1, an arc drawn by such route of the FFC 21-1 becomes large. As a consequence, force of the FFC 21-1 intending to return to a flat shape (i.e., a restoring force) is weak, and therefore, a pressing force of the FFC 21-1 against the inner wall 5-1 becomes weak. As a result, the friction force 23 becomes small, thereby producing a slippage between the FFC 21-1 and the inner wall 5-1, so that the shape of the FFC 21-1 indicated by the broken line is kept while being moved in the return direction. Consequently, an extra portion 24 of the FFC 21-1 is bent. Repeated bending may lead to a breakage. In order to prevent such a breakage, as shown in FIG. 2B (the FFC 21 (indicated by a solid line)), the FFC 21 comes from the electric board 19 through a clearance defined between ribs 17-2 and 17-3 disposed above the FFC positioning member 17 toward the inner wall 5-1. At this time, an arc drawn by a route of the FFC 21 toward the inner wall 5-1 is smaller than that drawn by the FFC 21-1 (i.e., the broken line). Consequently, the force of the FFC 21 intending to return to the flat shape (i.e., the restoring force) becomes stronger, so that the pressing force of the FFC 21 against the inner wall 5-1 becomes strong. As a consequence, the friction force 23 becomes large, thereby producing no slippage between the FFC 21 and the inner wall 5-1, and therefore, the extra portion 25 of the FFC 21 goes in the scan direction in FIG. 2B. In conclusion, the extra portion 25 of the FFC 21 cannot be bent, and thus, a breakage can be prevented.

Next, referring to FIGS. 3A to 3D, explanation will be made on a method for positioning the encoder sensor 15 in the image reading apparatus in the present preferred embodiment.

Figure 3A:
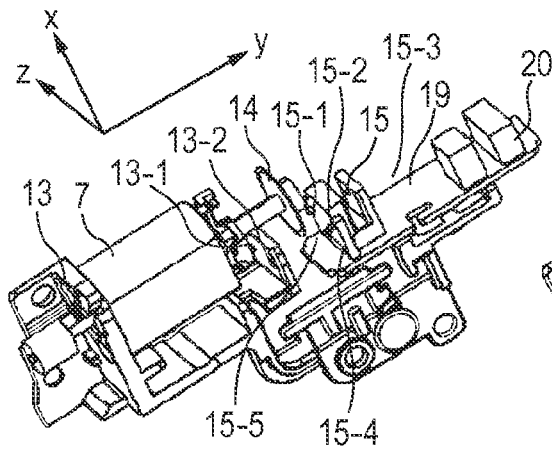
FIGS. 3A, 3B, 3C and 3D are views showing a method for securely positioning an encoder sensor.
Figure 3B:
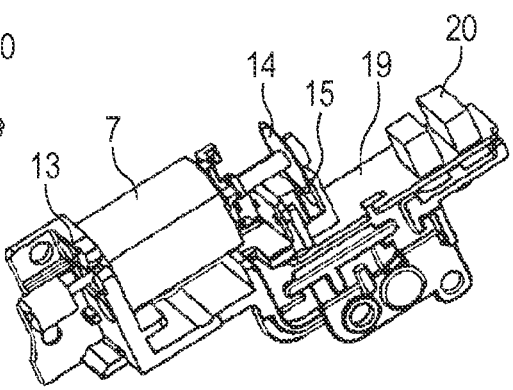

The encoder sensor 15 includes two positioning bosses 15-1 and 15-2 projecting on a plane on the DC motor 7 side in a direction of an optical axis 15-3 (i.e., a y direction). The two positioning bosses 15-1 and 15-2 are fitted into a round hole 13-1 and an oblong hole 13-2 formed in the support plate 13, respectively, thereby positioning the encoder sensor 15 in x and z directions. Moreover, the plane on which the two positioning bosses 15-1 and 15-2 are formed and the plane on which the round hole 13-1 and the oblong hole 13-2 are formed are brought into close contact with each other, thereby positioning the encoder sensor 15 in the y direction. In this manner, since the DC motor 7 having the code wheel 14 mounted thereon and the encoder sensor 15 are positioned only via a single component part of the support plate 13, they are advantageous from the viewpoint of a dimensional tolerance so as to achieve positioning with a high accuracy (FIGS. 3A and 3B).

In addition, a description will be given below of a method for fixing the encoder sensor 15 such positioned as described above.

The encoder sensor 15 does not have an encoder fixing screw hole which has been used in a general encoder (and which has been mostly formed at a lower portion of an encoder sensor) in order to reduce a size and a thickness. Frames 15-4 and 15-5 are formed outside of a region, in which functional component parts (i.e., a light source and a light receiving element) are disposed, in the encoder sensor 15. There is prepared a pressing member 16 having a cross section of U shape, for directly pressing the frames 15-4 and 15-5. Furthermore, a compression spring 18 (i.e., a resilient member) is interposed between the pressing member 16 and the FFC positioning member 17, for urging substantially in the same direction as that of a sensor reading optical axis (i.e., an optical axis between the light source and the light receiving element of the photo interrupter) of the encoder sensor 15. The direction of the reading optical axis is identical to the longitudinal direction of the CIS 2. The FFC positioning member 17 is securely positioned on a sensor holder unit of the carriage 3 via a screw. Moreover, the FFC positioning member 17 includes a boss 17-1 for positioning the compression spring 18 and preventing withdrawal.

Figure 3C:
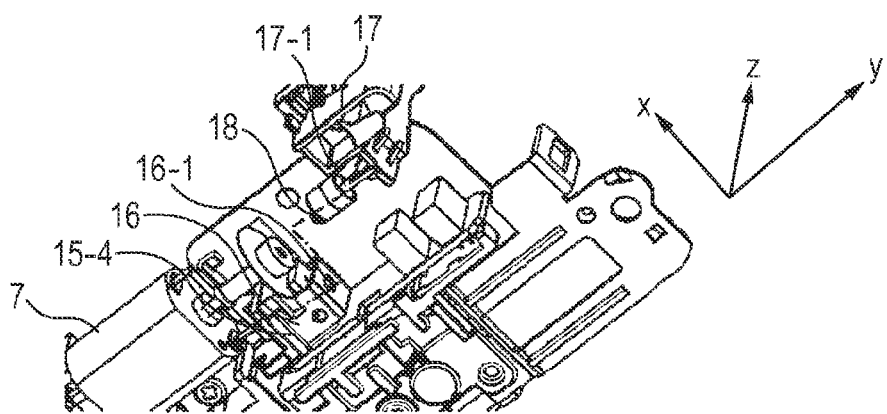
Figure 3D:
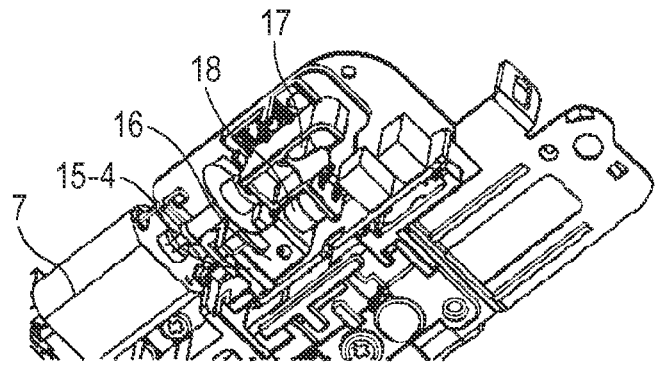

The compression spring 18 all the time urges the frames 15-4 and 15-5 of the encoder sensor 15 against the support plate 13 side via the pressing member 16. In this manner, the plane on which the positioning bosses 15-1 and 15-2 of the encoder sensor 15 are formed and the plane on which the round hole 13-1 and the oblong hole 13-2 are formed are kept to be firmly brought into close contact with each other. Additionally, the boss 17-1 formed at the FFC positioning member 17 is fitted to a positioning hole 16-1 formed in the pressing member 16, so that the pressing member 16 can be positioned in both of the x and z directions. Here, the pressing force of the compression spring 18 is presumed to be as strong as to resist a shock to be exerted on the image reading apparatus body such that the positioning bosses 15-1 and 15-2 cannot be drawn from the round hole 13-1 and the oblong hole 13-2. Consequently, the encoder sensor 15 can be securely fixed on the support plate 13 via the pressing member 16 by the urging force of the compression spring 18 (FIGS. 3C and 3D).

Explanation will be made below on the operation of the image reading apparatus in the present preferred embodiment with reference to FIGS. 1A to 1D, 2A, and 2B.

A user places an original whose image is to be read on the original table 1 with a surface to be read facing the original table. During ON of the power source in the image reading apparatus, the CIS 2 to be driven to stay at an image reading start position Xs. When image capturing is instructed to the image reading apparatus by a computer or the like, not shown, a drive signal including electric power is supplied to the DC motor 7 from the control board (i.e., the main board), not shown, via the flexible cable 21 and the electric board 19 in order to drive the DC motor 7. In this manner, the DC motor 7 is rotated, and then, the rotation is transmitted to the pinion gear 10 via the idler gears 8 and 9. The pinion gear 10 is driven in a direction T in FIG. 2B. The pinion gear 10 meshes with the rack 11, so that the CIS 2 is driven in the scan direction in FIG. 2B. At the same time, the CIS 2 is connected to the control board, not shown, by another flexible cable 22 (hereinafter referred to as an "FFC 22") shown in FIG. 1A, and then, is controlled. The FFC 22 includes a power source line for the CIS 2, a ground line, a control line for allowing an LED to emit a light beam, and a signal line for sending an image signal from an optical sensor element. Upon instructing the image capturing, the CIS 2 is driven at substantially the same time when the DC motor 7 is driven, and then, the LED of the CIS 2 as driven illuminates the original. Light beams reflected on the original at this time are focused on the optical sensor element by the rod lens array of the CIS 2. The optical sensor element sends the image signal to a control unit in the image reading apparatus (i.e., a scanner) by the FFC 22. When the DC motor 7 is driven and the CIS 2 is scanned, the CIS 2 is held in the carriage 3. Thus, the spacers 41 and 42 abut against the original table 1, so that the focal position of a rod lens of the CIS 2 is fixed at the original position on the original table 1.

In this manner, in the present preferred embodiment, the DC motor 7 is driven while the CIS 2 scans and reads the image of the original placed on the original table.

Although the drive source is the DC motor in the above-described preferred embodiment, another drive source such as a stepping motor may produce the same effect. The above-described preferred embodiment can provide the image reading apparatus capable of simultaneously achieving both reading the image with the high accuracy and reducing the size and thickness of the apparatus in the high order.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-142781, filed Jun. 28, 2011, which is hereby incorporated by reference herein in its entirety.

What is claimed is:

1. An image reading apparatus comprising:
a table having a surface on which an original is placed;
a carriage that includes an image sensor mounted thereon and configured to move in a scan direction parallel to the surface and crossing a longitudinal direction of the image sensor; and
a drive unit that is mounted on the carriage so as to move with the carriage in the scan direction,
the drive unit including:
a motor having a rotary shaft and a motor housing,
a gear train configured to transmit rotation of the rotary shaft so as to move the carriage,
a code wheel fixed to the rotary shaft,
an encoder sensor including a sensor housing and a sensing element mounted in the sensor housing, the encoder sensor configured to read the code wheel, and
a motor holder configured to hold the motor housing, the motor holder being fixed on the carriage,
wherein the sensor housing comes into contact with the motor holder by being urged with a resilient member in a direction substantially parallel to an axis of the rotary shaft, such that both of the motor housing and the sensor housing are positioned with respect to the motor holder.

2. The image reading apparatus according to claim 1, wherein the encoder sensor includes a light source and a light receiving element as the sensing element, and
wherein the sensor housing is urged by the resilient member substantially in the same direction as an optical axis between the light source and the light receiving element.

3. The image reading apparatus according to claim 1, further comprising:

an electric board on which the encoder sensor and a connector are mounted, wherein the connector is electrically connected to the sensor element and the motor.

4. The image reading apparatus according to claim 3, wherein a flexible cable for supplying electric power to the motor via the electric board is electrically connected to the connector, and wherein the drive unit further includes a positioning member for restricting a direction in which the flexible cable connected to the connector comes from the electric board.

5. The image reading apparatus according to claim 4, wherein the resilient member is sandwiched between the positioning member and the sensor housing.

6. The image reading apparatus according to claim 3, wherein as the drive unit on the carriage is viewed in a direction perpendicular to the surface, the motor, the gear train, the encoder sensor, the code wheel, and the electric board are arranged on one side in the scan direction with respect to the image sensor.

7. The image reading apparatus according to claim 6, wherein the motor is arranged such that the rotary shaft is oriented substantially in the same direction as the longitudinal direction of the image sensor, and one gear of the gear train is fixed at one end of the rotary shaft and the code wheel is fixed at another end of the rotary shaft.

8. The image reading apparatus according to claim 7, wherein the electric board is arranged such that the longitudinal direction of the electric board is identical to that of the image sensor, and further, the encoder sensor is arranged nearer the motor than the connector.

9. An image reading apparatus comprising:
a table having a surface on which an original is placed;
a carriage that includes an image sensor mounted thereon and configured to move in a scan direction parallel to the surface and crossing a longitudinal direction of the image sensor; and
a drive unit mounted on the carriage so as to move with the carriage in the scan direction,
the drive unit including:
a motor having a rotary shaft and a motor housing,
a gear train configured to transmit rotation of the rotary shaft so as to move the carriage,
a code wheel fixed to one end of the rotary shaft,
an encoder sensor including a light source and a light receiving element mounted in a sensor housing, the encoder sensor configured to read the code wheel,
a motor holder configured to hold the motor housing, the motor holder being fixed on the carriage, and
an electric board on which the encoder sensor and a connector are mounted, wherein the connecter is electrically connected to the encoder sensor and the motor,
wherein the sensor housing comes into contact with the motor holder such that both of the motor housing and the sensor housing are positioned with respect to the motor holder, and
wherein as the drive unit on the carriage is viewed in a direction perpendicular to the surface, the motor, the gear train, the encoder sensor, the code wheel, and the electric board are arranged on one side in the scan direction with respect to the image sensor.

10. The image reading apparatus according to claim 9, wherein the motor is arranged such that the rotary shaft is oriented substantially in the same direction as the longitudinal direction of the image sensor, and one gear of the gear train is fixed at one end of the rotary shaft and the code wheel is fixed at another end of the rotary shaft.

11. The image reading apparatus according to claim 10, wherein the electric board is arranged such that the longitudinal direction of the electric board is identical to that of the image sensor, and further, the encoder sensor is arranged nearer the motor than the connector.

* * * * *